(12) United States Patent
Hussain et al.

(10) Patent No.: US 10,821,710 B2
(45) Date of Patent: Nov. 3, 2020

(54) FLEXIBLE POLYIMIDE-BACKED AVIATION VENEER

(71) Applicant: GOODRICH CORPORATION, Charlotte, NC (US)

(72) Inventors: Farzana Hussain, Prospect, KY (US); Christopher L. Chapman, Lanesville, IN (US)

(73) Assignee: GOODRICH CORPORATION, Charlotte, NC (US)

( * ) Notice: Subject to any disclaimer, the term of this patent is extended or adjusted under 35 U.S.C. 154(b) by 205 days.

(21) Appl. No.: 15/473,070

(22) Filed: Mar. 29, 2017

(65) Prior Publication Data

US 2018/0281357 A1   Oct. 4, 2018

(51) Int. Cl.
| | |
|---|---|
| *B32B 3/00* | (2006.01) |
| *B32B 21/08* | (2006.01) |
| *B32B 7/12* | (2006.01) |
| *B32B 27/28* | (2006.01) |
| *B32B 27/06* | (2006.01) |
| *B32B 27/18* | (2006.01) |
| *B32B 27/14* | (2006.01) |
| *B64C 1/06* | (2006.01) |
| *B32B 37/10* | (2006.01) |
| *B32B 37/12* | (2006.01) |
| *B32B 38/18* | (2006.01) |

(52) U.S. Cl.
CPC ............... *B32B 21/08* (2013.01); *B32B 7/12* (2013.01); *B32B 27/06* (2013.01); *B32B 27/14* (2013.01); *B32B 27/18* (2013.01); *B32B 27/281* (2013.01); *B32B 37/10* (2013.01); *B32B 37/12* (2013.01); *B32B 38/1866* (2013.01); *B32B 2307/3065* (2013.01); *B32B 2605/003* (2013.01); *B32B 2605/18* (2013.01); *B64C 1/066* (2013.01); *Y02T 50/40* (2013.01)

(58) Field of Classification Search
CPC ......... B32B 21/00; B32B 21/02; B32B 21/04; B32B 21/042; B32B 21/047; B32B 21/06; B32B 21/08; B32B 21/10; B32B 21/12; B32B 21/13; B32B 21/14; B32B 3/10; B32B 3/14; B32B 3/16
USPC ................ 428/106, 473.5, 511, 425.1, 479.6
See application file for complete search history.

(56) References Cited

U.S. PATENT DOCUMENTS 5,423,933 A * 6/1995 Horian ...................... B27D 1/00
156/182
6,184,333 B1 * 2/2001 Gray ...................... C08G 73/10
525/420

FOREIGN PATENT DOCUMENTS

WO   WO-2015126436 A1 * 8/2015 ............. B32B 21/14

OTHER PUBLICATIONS

204TS Technical Datasheet, Lenderink, accessed Feb. 4, 2018 from https://lenderink.com/wp-content/uploads/2015/02/tds204TS-1.pdf (Year: 2015).*

(Continued)

*Primary Examiner* — Prashant J Khatri
*Assistant Examiner* — Zachary M Davis
(74) *Attorney, Agent, or Firm* — Snell & Wilmer L.L.P.

(57) ABSTRACT

A veneer assembly comprises a face veneer comprising at least one of a wood or a wood composite, and a polyimide backing-layer bonded to the face veneer. The veneer assembly may include an adhesive material boding the face veneer and the polyimide backing-layer. The veneer assembly may be mounted to a substrate to form an aviation veneer panel.

16 Claims, 4 Drawing Sheets

(56) References Cited

OTHER PUBLICATIONS

Petrie, "Fire-Retardant Adhesives", Nov. 2007, Adhesives & Sealants Industry, pp. 34-37 (Year: 2007).*
Kapton FPC datasheet, retrieved from http://americandurafilm.com/data-sheets/kapton-fpc.pdf, retrieved Feb. 28, 2020, available Aug. 4, 2016 (Year: 2016).*

* cited by examiner

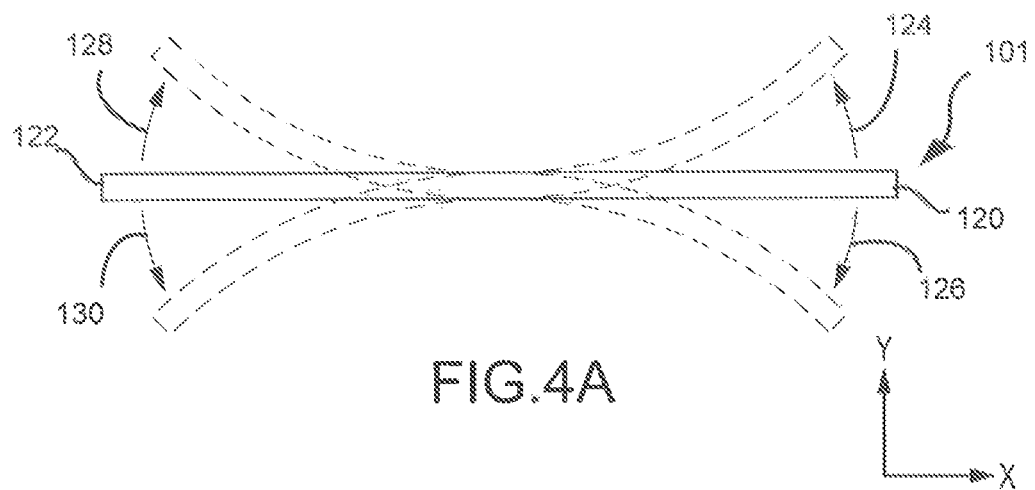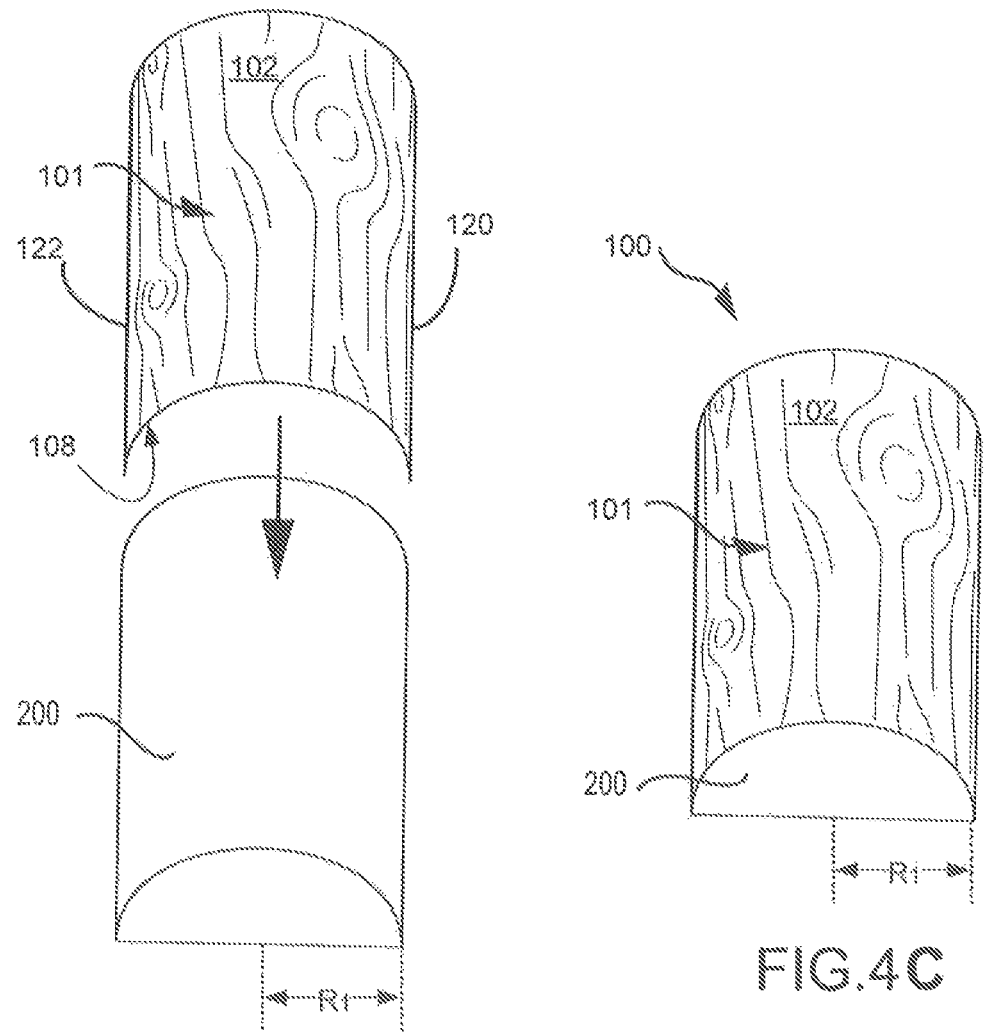

FLEXIBLE POLYIMIDE-BACKED AVIATION VENEER

FIELD

The present disclosure relates to decorative and structural veneer assemblies and, more particularly, to a polyimide-backed veneer assembly and methods for making a polyimide-backed veneer assembly.

BACKGROUND

Current veneer panels may include paper-backed veneer assemblies, fleece-backed veneer assemblies, and two-ply veneer assemblies. Paper and fleece backing layers may have low tensile strength and veneer assemblies incorporating paper and/or fleece backing layers may be prone to tears or wrinkling. The two-ply veneer assembly may be susceptible to rips and curling. Further, each of the existing veneer assemblies may experience delamination in some applications. In other instances, the veneer assemblies may not be useable in vehicular applications due to limitations such as conformance with flammability regulations.

SUMMARY

A veneer assembly is provided according to various embodiments. A veneer assembly may comprise a face veneer comprising at least one of a wood or a wood composite, and a polyimide backing-layer bonded to the face veneer.

In various embodiments, the polyimide backing-layer is configured to cover a back surface of the face veneer. An adhesive material may bond the polyimide backing-layer and the face veneer. The adhesive material may comprise at least one of a phenolic dry glue film, an epoxy-based dry film, a polyurethane dry film, a polyvinyl alcohol film, a nitrite-phenolic film, an acrylic adhesive, a thermosetting resin, or a thermoplastic resin. The adhesive material may include a flame retardant additive. The polyimide backing-layer may comprise a thickness from 0.001 inches to 0.010 inches. The veneer assembly may be conformable to a radius of curvature of 0.5 inches.

An aviation veneer panel is provided according to various embodiments. An aviation veneer panel may comprise a substrate and a veneer assembly coupled to the substrate, the veneer assembly comprising, a face veneer and a polyimide backing-layer bonded to the face veneer.

In various embodiments, an adhesive material may bond between the polyimide backing-layer and the face veneer. The adhesive material may comprise a flame retardant additive. The adhesive material may comprise at least one of a phenolic dry glue film, an epoxy-based dry film, a polyurethane dry film, a polyvinyl alcohol film, a nitrile-phenolic film, an acrylic adhesive, a thermosetting resin, or a thermoplastic resin. The veneer assembly may be conformable to a radius of curvature of 0.5 inches. The polyimide backing-layer may comprise a thickness from 0.001 inches to 0.010 inches.

A method of making a veneer assembly is provided according to various embodiments. A method of making a veneer assembly may comprise stacking a face veneer and a polyimide backing-layer, and pressing the face veneer and the polyimide backing-layer together.

In various embodiments, the method may comprise bonding the polyimide backing-layer and the face veneer using an adhesive material. The adhesive material may comprise at least one of a phenolic dry glue film, an epoxy-based dry film, a polyurethane dry film, a polyvinyl alcohol film, a nitrile-phenolic film, an acrylic adhesive, a thermosetting resin, or a thermoplastic resin. The polyimide backing-layer may comprise a thickness from 0.001 inches to 0.010 inches. In various embodiments, the method may comprise fire treating the face veneer and polyimide backing-layer. The veneer assembly may be conformable to a radius of curvature of 0.5 inches. In various embodiments, the method may comprise flexing the veneer assembly using a flex machine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 4A, 4B, and 4C illustrate a flexibility of a polyimide-backed veneer assembly for use in aviation veneer panels, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Polyimide-backed veneers according to the present disclosure may be mounted to furniture (e.g., cabinetry, tables, chairs, hand rails, etc.) or other elements within an aircraft interior. Polyimide-backed veneers, according to the present disclosure, may comprise a wooden face layer bonded to a polyimide backing-layer, for example a polyimide film. Adhesive material may bond the two layers together with each layer having a thickness in a first dimension that is substantially less than a thickness of the layer in the other two dimensions. The adhesive material may be an adhesive coating included on the polyimide backing-layer or a separate layer disposed between the face layer and the polyimide backing-layer during the layup process. The polyimide-backed veneer assembly, according to the present disclosure, may display flexibility relative to the plane formed by the two larger dimensions. The polyimide-backed veneer assembly, according to the present disclosure, may provide weight savings, reduced packaging density, increased flexibility, decreased cost, increased dependability, reduced manufacturing time, increased resistance to tearing, and increased burn resistance.

Figure 1:
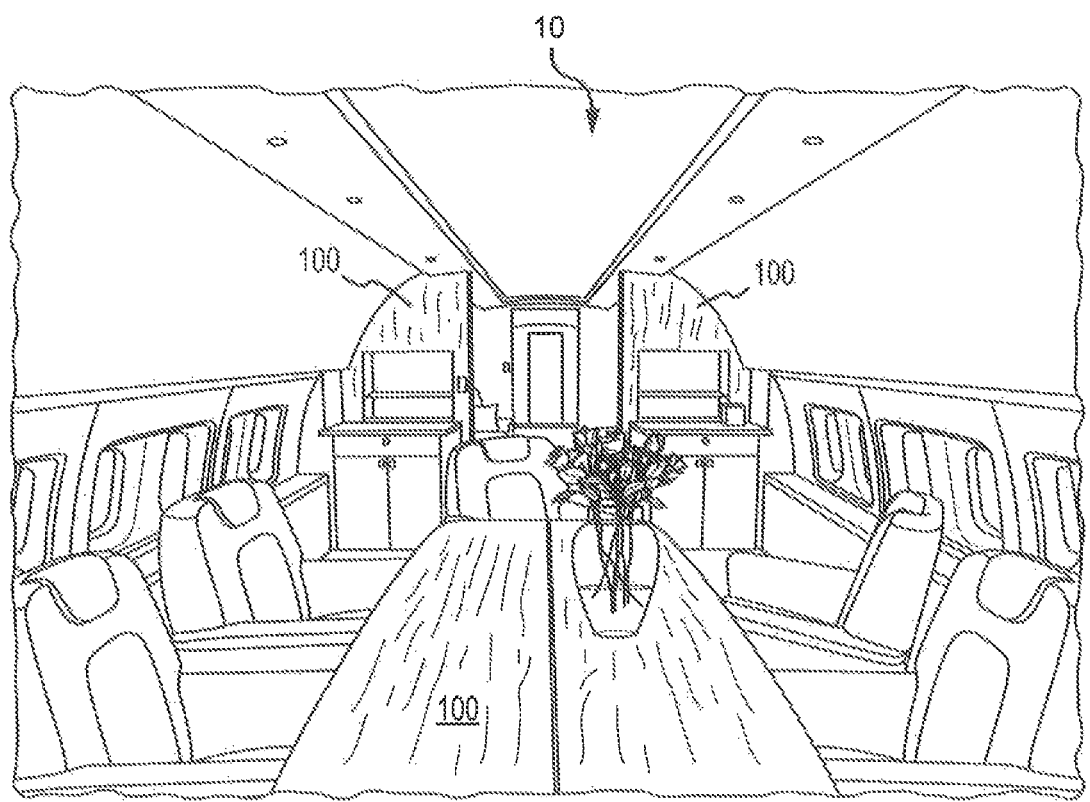
FIG. 1 illustrates an aircraft interior including various elements comprising aviation veneer panels, in accordance with various embodiments.

Referring now to FIG. 1, an aircraft interior 10 including various elements comprising aviation veneer panels 100 is shown, in accordance with various embodiments. Aviation veneer panels 100 may include a polyimide-backed veneer assembly, as described below, mounted or otherwise coupled to a substrate (e.g., cabinetry, tables, chairs, hand rails, etc.). While veneer panels are used in other industries to make, for example, furniture, cabinets, etc., aviation veneer panels 100 are typically held to stringent aesthetic and regulatory standards. For example, aviation veneer panels used in private aircraft may be cut from wood logs that have aesthetically pleasing grain patterns with low prevalence of defects. To ensure consistency throughout an aircraft's interior, it may be necessary to use a single log in its entirety for a single aircraft. The rarity of wood logs that meet the aesthetic and regulatory standards for aviation veneer panels, coupled with the volume used in a typical aircraft interior make aviation veneer panels much more expensive relative to other veneer panels.

Figure 2:
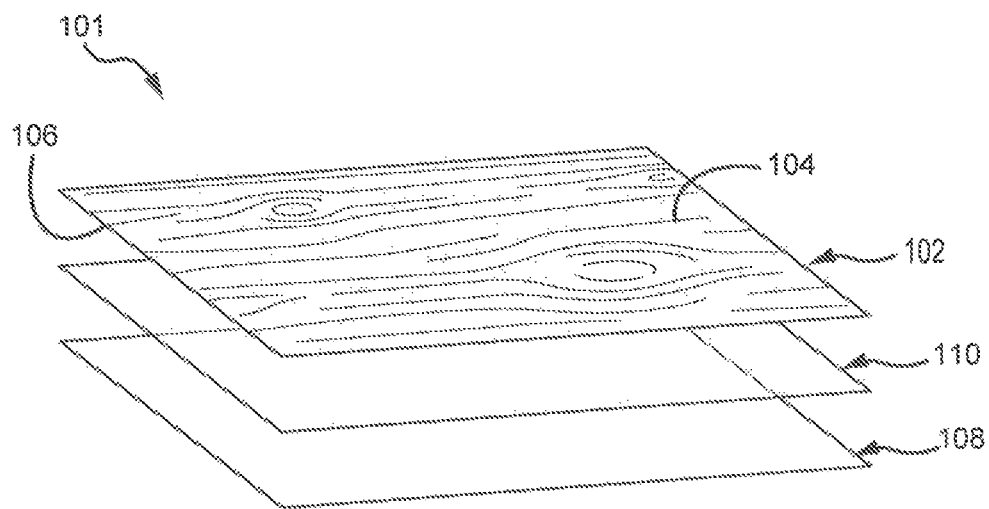
FIG. 2 illustrates an assembly view of a polyimide-backed veneer assembly, in accordance with various embodiments.

With reference to FIG. 2, an assembly view of veneer assembly 101 is shown, in accordance with various embodiments. Veneer assembly 101 may comprise a face veneer 102. Face veneer 102 includes a first surface 104 and a second surface 106 (also referred to herein as back surface 106) opposite first surface 104. Face veneer 102 may comprise a thin layer of walnut, cherry, birch, rosewood, oak, maple, mahogany, hemlock, teak, walnut, or other wood species including burl patterns. Face veneer 102 may be manufactured from most wood species, common and exotic alike. Face veneer 102 may also be a manufactured product comprising one or more natural wood(s) and/or synthetic materials, referred to herein as "composite wood." Thus, face veneer 102 may comprise be real wood (a natural species) or composite wood. In various embodiments, first surface 104 of face veneer 102 may be sanded to provide a smooth, decorative surface for finishing. With monetary reference to FIG. 3, in various embodiments, face veneer 102 may have a thickness T1 ranging from 0.015 inches to 0.030 inches (0.381 mm to 0.762 mm). For example, face veneer 102 may comprise a thickness T1 of 0.02 inches (0.508 mm).

Returning to FIG. 2, face veneer 102 may be configured to face a polyimide backing-layer 108. In various embodiments, polyimide backing-layer 108 comprises a polyimide film. Polyimide backing-layer 108 may be adhered to back surface 106 of face veneer 102, thereby forming veneer assembly 101. More particularly, polyimide backing-layer 108 may be configured to adhere to and cover back surface 106 of face veneer 102. In various embodiments, the surface of polyimide backing-layer 108 that bonds to face veneer 102 may include an adhesive coating. With momentary reference to FIG. 3, in various embodiments, polyimide backing-layer 108 may have a thickness T2 ranging from 0.0005 inches to 0.100 inches (i.e., from 0.0127 mm to 2.54 mm). In various embodiments, polyimide backing-layer 108 may have a thickness T2 ranging from 0.001 inches to 0.010 inches (i.e., from 0.0254 mm to 0.254 mm). For example, polyimide backing-layer 108 may comprise a thickness T2 of 0.005 inches (0.127 mm).

In various embodiments, an adhesive material 110 may be applied between back surface 106 of face veneer 102 and polyimide backing-layer 108. Adhesive material 110 may bond polyimide backing-layer 108 to the back surface 106 of face veneer 102. In various embodiments, adhesive material 110 may comprise a thermosetting adhesive. Adhesive material 110 may comprise a phenolic dry glue film (PGF), an epoxy-based dry film, a polyurethane dry film, a polyvinyl alcohol (PVA) film, a nitrile-phenolic film, an acrylic adhesive, a thermosetting resin, a thermoplastic resin, or other suitable adhesive material. In various embodiments, adhesive material 110 may include a flame retardant additive. The flame retardant additive may include a halogenated flame retardant, a non-halogenated flame retardant, or other suitable flame retardant.

In various embodiments, adhesive material 110 may comprise a dry film allowing adhesive material 110 to be cut into sheet form and disposed between back surface 106 of face veneer 102 and polyimide backing-layer 108 during the layup process. Adhesive material 110 may be a continuous sheet cut into a shape to mirror the shape of face veneer 102 and polyimide backing-layer 108. In various embodiments, adhesive material 110 may be an adhesive coating included on the surface of polyimide backing-layer 108. Adhesive material 110 may be integrally formed on the surface of polyimide backing-layer 108 that will be bonded to back surface 106 of face veneer 102.

Polyimide backing-layer 108 may be disposed adjacent adhesive material 110 to form the bottom surface of veneer assembly 101. In that regard, polyimide backing-layer 108 may provide support for veneer assembly 101. Face veneer 102, adhesive material 110, and polyimide backing-layer 108 may each be a separate layer cut into the same shape and be aligned prior to a heat pressing treatment to form the veneer assembly 101. Veneer assembly 101 may be formed in any dimensions, and readily be made into rectangular 4 foot by 8 foot (1.2 m by 2.4 m) panels. Veneer assembly 101 may also be cut into smaller sizes or varied shapes, depending on the substrate (e.g., cabinet, table, rail, etc.) to which veneer assembly 101 will ultimately be mounted.

Figure 3:
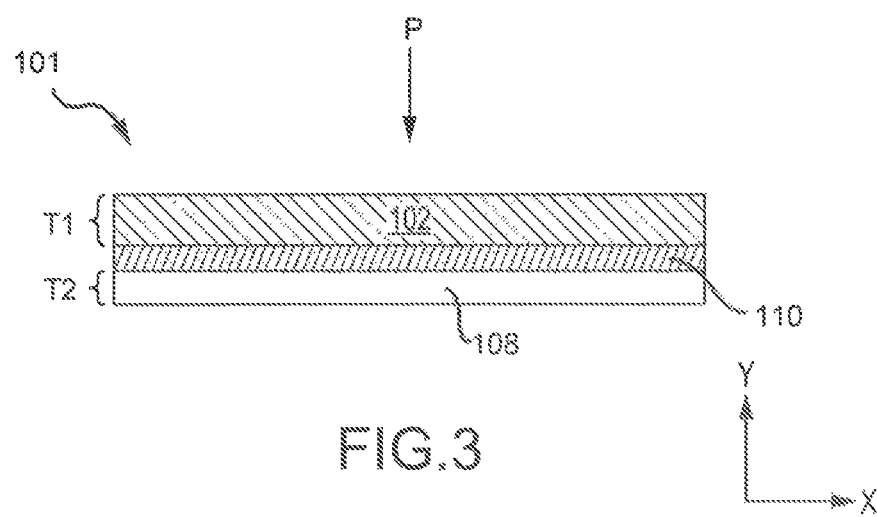
FIG. 3 illustrates a cross-sectional view of a polyimide-backed veneer assembly, in accordance with various embodiments.

With reference to FIG. 3, veneer assembly 101 is shown with a heat and/or pressure treatment (e.g., by pressing veneer assembly 101 inside a press machine), in accordance with various embodiments. Pressure P may be a compressive force applied uniformly and/or substantially uniformly across the outer surfaces of veneer assembly 101 through face veneer 102 and polyimide backing-layer 108. Veneer assembly 101 may also be heated to reach the thermal threshold to set thermosetting adhesive materials. In various embodiments, face veneer 102 may be bonded to polyimide backing-layer 108 by applying a pressure P of between 100 pounds per square inch (psi) and 300 psi (i.e., between 689 kilopascals (kPa) and 2068 kPa) to veneer assembly 101 at a temperature of between 150° F. and 350° F. (i.e., between 65.6° C. and 177° C.) for between 3 minutes and 15 minutes. For example, face veneer 102 may be bonded to polyimide backing-layer 108 by applying a pressure P of between 180 psi and 250 psi (i.e., between 1241 kPa and 1724 kPa) to veneer assembly 101 at a temperature of 300° F. (149° C.) for 5 minutes.

In various embodiments, and in response to the increased temperature and pressure, adhesive material 110 may penetrate into fibers of the wood used for face veneer 102 as well as into polyimide backing-layer 108. Polyimide backing-layer 108 and face veneer 102 may press together and contact one another or have a thin layer of adhesive remaining between one another. Adhesive material 110 may then thermoset and initiate cross-linking bonds. Adhesive material 110 that has invaded into face veneer 102 and polyimide backing-layer 108 may provide a strong adhesion and resist delamination.

In various embodiments, veneer assembly 101 may be run through a flex machine to introduce small micro cracks into veneer assembly 101 by flexing the assembly. The microcracks may not be visible to the naked eye but nonetheless may improve flexibility of the assembly.

According to various embodiments, veneer assembly 101 may be treated with a fire retardant chemical for fire protection. The fire retardant chemical may include a halogenated fire retardant chemical, a non-halogenated fire retardant chemical, a salt-based fire retardant chemical or other suitable fire retardant chemical.

In various embodiments, veneer assembly 101 may not be treated with a fire retardant chemical for fire protection and may still be incombustible (i.e., comply with flammability regulations) given the fire resistant properties of polyimide backing-layer 108. In various embodiments, polyimide backing-layer 108 may be configured to withstand temperatures up to 1300° F. (704° C.). In various embodiments, adhesive material 110 may include a fire retardant additive. The fire retardant additive may serve as intumescent flame retardant.

Bonding face veneer 102 to polyimide backing-layer 108 may provide a thin and light weight veneer assembly 101 that is resistant to tearing and delamination. Polyimide backing-layer 108 may improve the flexibility, rip resistance, and/or curling resistance of veneer assembly 101. Polyimide backing-layer 108 may improve a tensile strength, tear strength, peel strength, burn resistance, moisture resistance, curling resistance, and/or delamination resistance of veneer assembly 101, as compared to conventional glass or fleece backing layers. Polyimide backing-layer 108 may provide a backing layer having flexibility while still providing a degree of rigidity to support face veneer 102.

With reference to FIG. 4A, a flexibility and/or bendability of veneer assembly 101 is illustrated, in accordance with various embodiments. Veneer assembly 101, comprising face veneer 102 and polyimide backing-layer 108, may be configured to display increased flexibility with a degree of rigidity. For example, first edge 120 of veneer assembly 101 may travel in a direction of arrow 124 and/or arrow 126, while second edge 122 of veneer assembly 101 remains stationary, travels in a direction of arrow 128, or travels in a direction of arrow 130. Second edge 122 of veneer assembly 101 may travel in a direction of arrow 128 and/or arrow 130, while first edge 120 of veneer assembly 101 remains stationary, travels in a direction of arrow 124, or travels in a direction of arrow 126. The flexibility of face veneer 102 and polyimide backing-layer 108 allows veneer assembly 101 to conform to and/or wrap around a substrate comprising a concave, convex, or any other shape surface. In various embodiments, veneer assembly 101 may be conformable to a radius of curvature of 0.5 inches (5.08 cm) or greater. For example, veneer assembly 101 may be configured to conform to a radius of curvature of 2 inches (5.08 cm); veneer assembly 101 may be configured to conform to a radius of curvature of 1 inch (2.54 cm); veneer assembly 101 may be configured to conform to a radius of curvature of 0.5 inches (1.27 cm).

With reference to FIG. 4B and FIG. 4C, an aviation veneer panel 100 is illustrated, in accordance with various embodiments. Aviation veneer panel 100 may include veneer assembly 101 mounted to substrate 200. Veneer assembly 101 may comprise face veneer 102 and polyimide backing-layer 108. Substrate 200 may comprise an aviation interior element, (e.g., a table, chair, cabinetry, hand rail, etc.). Veneer assembly 101 may be located over substrate 200 with face veneer 102 oriented away from substrate 200 and polyimide backing-layer 108 oriented toward substrate 200. Veneer assembly 101 may be conformable to the geometry of substrate 200. Substrate 200 may include a radius of curvature R1. Veneer assembly 101 may be configured to conform to radius of curvature R1. In various embodiments, radius of curvature R1 may be 0.5 inches (1.27 cm) or greater.

Figure 5:
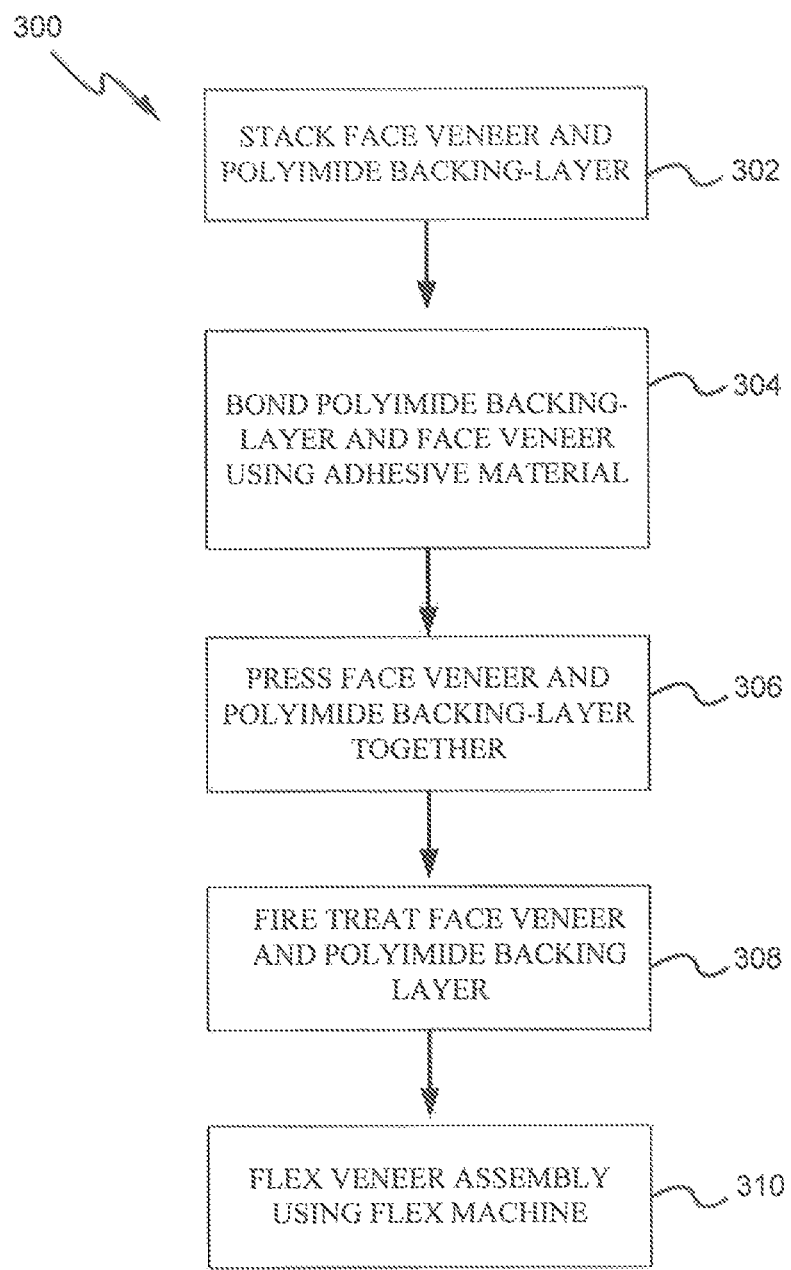
FIG. 5 illustrates a flow diagram of a method of making a polyimide-backed veneer assembly, according to various embodiments.

With reference to FIG. 5, a method 300 of making a veneer assembly is provided, in accordance with various embodiments. Method 300 may comprise stacking a face veneer and a polyimide backing-layer (step 302). Method 300 may comprise bonding the polyimide backing-layer and the face veneer using an adhesive material (step 304). Method 300 may comprise pressing the face veneer and the polyamide backing-layer (step 306). Method 300 may comprise fire treating the face veneer and polyimide backing-layer (step 308). Method 300 may comprise flexing the veneer assembly using a flex machine (step 310).

In various embodiments, with combined reference to FIG. 2, FIG. 3, and FIG. 5, step 302 may comprise stacking face veneer 102 and polyimide backing-layer 108. Step 304 may comprise bonding polyimide backing-layer 108 and face veneer 102 using adhesive material 110. Step 306 may comprise pressing face veneer 102 and polyimide backing-layer 108. Step 308 may comprise fire treating face veneer 102 and polyimide backing-layer 108. Step 310 may comprise flexing veneer assembly 101 using a flex machine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus axe provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A veneer assembly for forming an aviation veneer, comprising:
   a face veneer comprising at least one of a wood or a wood composite;
   a polyimide backing-layer bonded to the face veneer, wherein the polyimide backing-layer forms a bottom surface of the veneer assembly, wherein the polyimide backing-layer has a thickness less than 0.010 inches, wherein a surface of the face veneer opposite the polyimide backing-layer comprises a plurality of micro cracks; and
   an adhesive material bonding the polyimide backing-layer and the face veneer, the adhesive material comprises at least one of a phenolic dry glue film, an epoxy-based dry film, a polyurethane dry film, a polyvinyl alcohol film, a nitrile-phenolic film, or a thermosetting resin.

2. The veneer assembly of claim 1, wherein the polyimide backing-layer is configured to cover a back surface of the face veneer.

3. The veneer assembly of claim 1, wherein the adhesive material includes a fire retardant additive.

4. The veneer assembly of claim 1, wherein the thickness of the polyimide backing-layer is between 0.001 inches and 0.005 inches.

5. The veneer assembly of claim 1, wherein the veneer assembly is conformable to a radius of curvature of 0.5 inches.

6. An aviation veneer panel, comprising:
   a substrate comprising an aviation interior element; and
   a veneer assembly coupled to the substrate, the veneer assembly comprising,
      a face veneer comprising at least one of a wood or a wood composite; and
      a polyimide backing-layer bonded to the face veneer, wherein the polyimide backing-layer forms a bottom surface of the veneer assembly, the bottom surface of the veneer assembly being oriented toward the substrate, and wherein the polyimide backing-layer has a thickness less than 0.010 inches, and wherein a surface of the face veneer opposite the polyimide backing-layer comprises a plurality of micro cracks.

7. The aviation veneer panel of claim 6, further comprising an adhesive material bonding the polyimide backing-layer and the face veneer.

8. The aviation veneer panel of claim 7, wherein the adhesive material comprises a flame retardant additive.

9. The aviation veneer panel of claim 7, wherein the adhesive material comprises at least one of a phenolic dry glue film, an epoxy-based dry film, a polyurethane dry film, a polyvinyl alcohol film, a nitrile-phenolic film, an acrylic adhesive, a thermosetting resin, or a thermoplastic resin.

10. The aviation veneer panel of claim 6, wherein the substrate comprises a radius of 0.5 inches.

11. The aviation veneer panel of claim 6, wherein the thickness of the polyimide backing-layer is between 0.001 inches and 0.005 inches.

12. A veneer assembly, comprising:
   a face veneer comprising at least one of a wood or a wood composite; and
   a polyimide backing-layer bonded to the face veneer, wherein the polyimide backing-layer forms a bottom surface of the veneer assembly, wherein the polyimide backing-layer has a thickness less than 0.010 inches, and wherein a surface of the face veneer opposite the polyimide backing-layer comprises a plurality of micro cracks.

13. The veneer assembly of claim 12, further comprising an adhesive material bonding the polyimide backing-layer and the face veneer.

14. The veneer assembly of claim 13, wherein the adhesive material comprises a flame retardant additive.

15. The veneer assembly of claim 12, wherein the face veneer comprises a thickness between 0.015 inches and 0.030 inches.

16. The veneer assembly of claim 15, wherein the thickness of the polyimide backing-layer is between 0.001 inches and 0.005 inches.

* * * * *